United States Patent [19]
Rooke

[11] 3,915,289
[45] Oct. 28, 1975

[54] ENDLESS CONVEYORS WITH PIVOTED SHELVES AND VARIABLE LENGTH CONTROL ARMS

[75] Inventor: Sydney W. Rooke, Erith, England

[73] Assignee: Sovex Limited, Erith, England

[22] Filed: Apr. 18, 1973

[21] Appl. No.: 352,853

[30] Foreign Application Priority Data
Apr. 18, 1972 United Kingdom............... 17929/72

[52] U.S. Cl. .............................................. 198/157
[51] Int. Cl............................................ B65g 17/00
[58] Field of Search ........... 198/138, 158, 157, 154, 198/155; 214/16.1 B, 16.1 BB

[56] References Cited
UNITED STATES PATENTS

| | | | |
|---|---|---|---|
| 1,240,172 | 9/1917 | Breneman............................ | 198/137 |
| 1,793,062 | 2/1931 | Collier................................. | 198/158 |
| 1,875,183 | 8/1932 | Spriggs................................ | 198/138 |
| 3,080,040 | 3/1963 | Estabrooks et al. ............. | 198/138 X |
| 3,102,796 | 9/1963 | Erickson.......................... | 198/154 X |
| 3,717,237 | 2/1973 | Pearson ............................. | 198/27 |

FOREIGN PATENTS OR APPLICATIONS
577,031   11/1929   Germany ............................ 198/138

Primary Examiner—Richard A. Schacher
Assistant Examiner—Douglas D. Watts
Attorney, Agent, or Firm—Pollock, Philpitt & Vande Sande

[57] ABSTRACT

An endless conveyor comprising an endless main driving member guided along the path of the conveyor and pivotally coupled to a load carrier which is also pivotally connected to an endless control member, the main and control members being guided with respect to each other such that the attitude of the load carrier is under positive control throughout its travel along the conveyor path, and is varied in dependence on the relative distance between the main driving member and the control member. The control member is displaced with respect to the path of the main driving member by an amount equal to the effective length of the connection between the carrier pivot axis and the control member in each region of the conveyor where the load carrrier is horizontal. The load carrier is coupled to the control member by means which adjust the effective length of the coupling where the load carrier is being pivoted between two limit positions.

8 Claims, 13 Drawing Figures

ENDLESS CONVEYORS WITH PIVOTED SHELVES AND VARIABLE LENGTH CONTROL ARMS

This invention relates to endless conveyors, particularly those conveyors travelling in a closed circuit and arranged to convey a load between a loading station and a discharge station arranged at different heights.

According to the invention there is provided an endless conveyor comprising an endless main driving member guided along the path of the conveyor, said main driving member being pivotally coupled to a load supporting member, the load supporting member also being pivotally connected to an endless control member guided along the path of the conveyor in parallel to said main driving member, the main driving member and the control member being guided with respect to each other such that the attitude of the load supporting member is under positive control throughout its travel along the path of the conveyor, the attitude of the load supporting member being variable in dependence on the relative displacement of the guide means for the control member with respect to the path of the main driving member.

The conveyor preferably consists of two main members which are endless chains guided along parallel paths, the trays being pivotally mounted between opposed axes on the two chains. The control member is a further pilot chain or chains connected pivotally to the trays and guided with respect to the main chains so that the attitude of the trays is under continuous control and may be varied by altering the relative tracks of the main and pilot chains. By such a system the trays can be turned through 90° so that if the conveyor is an elevator, the trays may be brought into the vertical attitude on their unloaded run in order to reduce the space required for the vertical runs of the conveyor, the trays being returned to the horizontal to carry their desired loads.

Embodiments of the invention will now be described by way of example and with reference to the accompanying drawings in which:-

Figure 1:
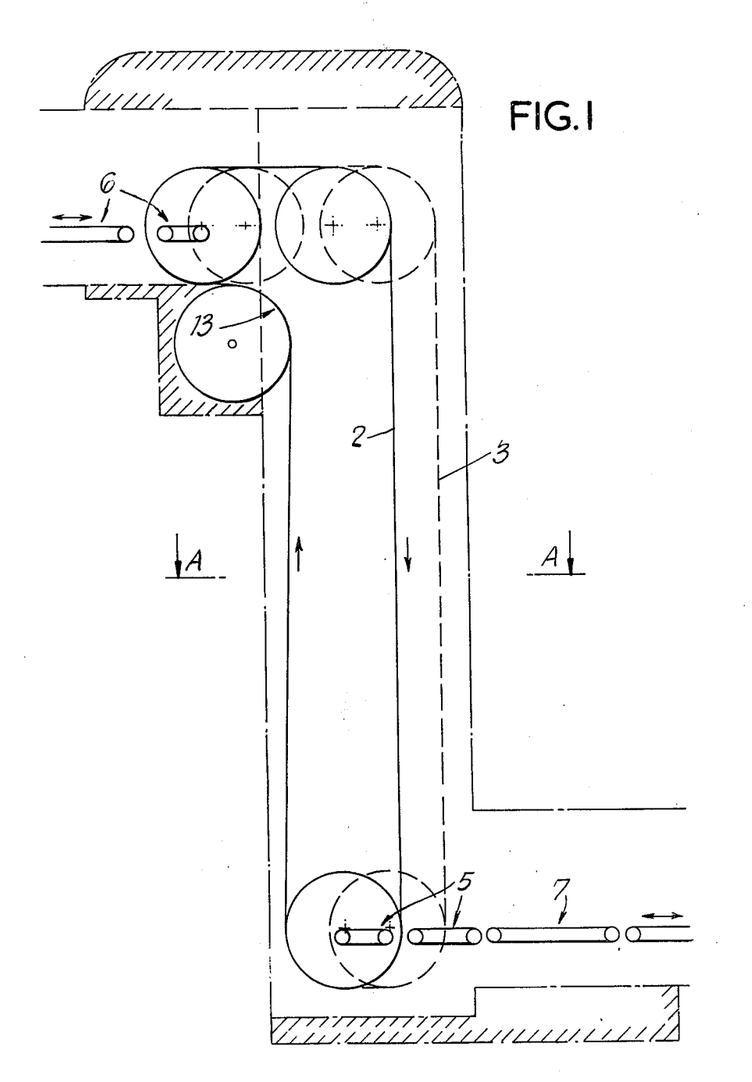
FIG. 1 is a schematic side elevation of a vertically operating elevator conveyor.
Figure 2:
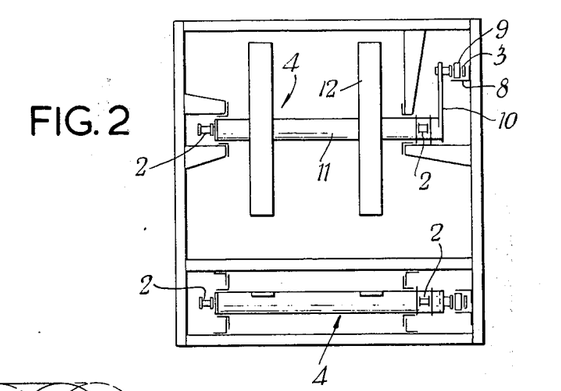
FIG. 2 is a cross section of FIG. 1 on the lines A—A.

As shown diagrammatically in FIG. 1 and in greater detail in FIG. 2, the conveyor consists of two parallel endless main chains 2 guided over wheels on common parallel axes, these chains pivotally supporting a plurality of load carrying members or trays 4. Each tray 4 has a rigid arm or crank 10 extending from it in the plane of its load surface, the other end of the crank 10 being pivotally connected to a pilot chain 3. Pilot chain 3 is also guided by wheels 9 on a track 8 and this chain and its wheels 9 are arranged so that they are laterally displaced from the main chains 2 by an amount equal to the length of the crank 10 in those regions of the conveyor where the trays are required to be horizontal. If the three chains are brought into a common plane as shown in the lower part of FIG. 2, the effect is to pivot each tray 4 into a vertical attitude until the chains 2 and 3 are again relatively displaced. If the pilot chain 3 is moved to a distance between its original displacement and the plane of the main chains 2, the trays will be correspondingly tilted into an inclined position. As FIG. 1 shows, where the conveyor travelling is vertical, the tipping of the trays 4 into a vertical position in one run, in this case the left hand, upward section, enables the overall cross-section dimension of the conveyor to be reduced. Thus if the conveyor passes through a structure such as a building the apertures in the floors of the building can be smaller, or a narrower shaft can be provided. As compared to a "swing tray" elevator, in which the trays depend from a higher point on the chains, so as to obtain stability under gravity, the loading and discharge grids can be placed much nearer the top and bottom of the conveyor, so saving height at the top and avoiding the use of pits at the bottom.

The main chains 2 are driven by a suitable motor (not shown), the pilot chain 3 being driven at the same linear speed by the motor or by providing a driving connection between the guide wheels of the main and pilot chains.

In FIG. 1, the conveyor is arranged to convey articles from the loading point 6 to the lower discharge station which consists of the conveyors 5 and 7. The direction in which the chains run is shown by arrows and in the upward run the trays T are vertical because the main and pilot chains 2 and 3 lie in a common plane.

If the conveyor is run in the reverse direction, conveyors 5 and 7 act to load the trays while conveyor 6 discharges them, the trays being vertical as they descend.

Figure 6:
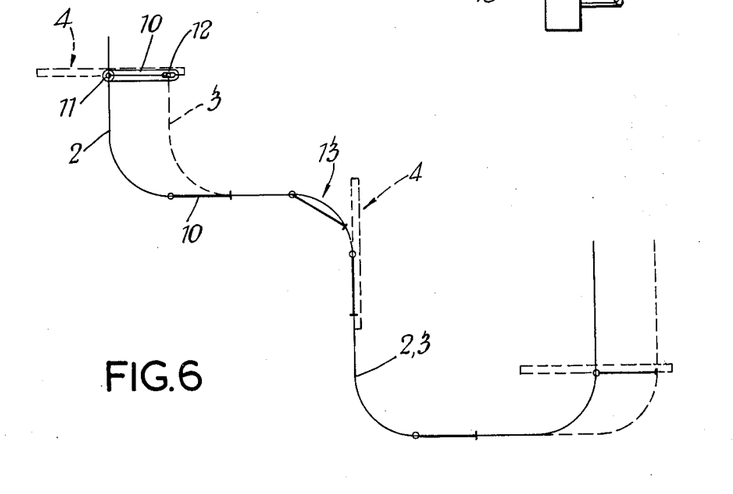
FIG. 6 illustrates schematically how the effective length of the connecting link between the main driving member and the control member is adjusted where the attitude of the tray is altered.

FIG. 2 is a cross section of FIG. 1 on the line A—A and shows the trays 4 in their horizontal and vertical attitudes. Also visible in FIG. 2 is the crank 10 which connects pilot chain 3 to the axle 11 which carries the tray 4. At points such as 13 in FIG. 1, the length of the crank is effectively reduced to accommodate the chording effect; in this embodiment by means of a slot provided in the crank 10. Other means such as a resiliently telescopic arm or a block and slide arrangement may also be used for this purpose where the trays 4 are being pivoted between vertical and horizontal limit positions. The trays 4 are made up of parallel slats 12 to facilitate loading and unloading as will be explained below; FIG. 6 shows schematically how the attitude of each tray 4 is controlled at all times by the displacement of the pilot chain 3 with respect to the main chain 2. In an alternative embodiment the trays may be flat sheet members, pans or grids or the like depending on the loads to be conveyed.

Figure 3:
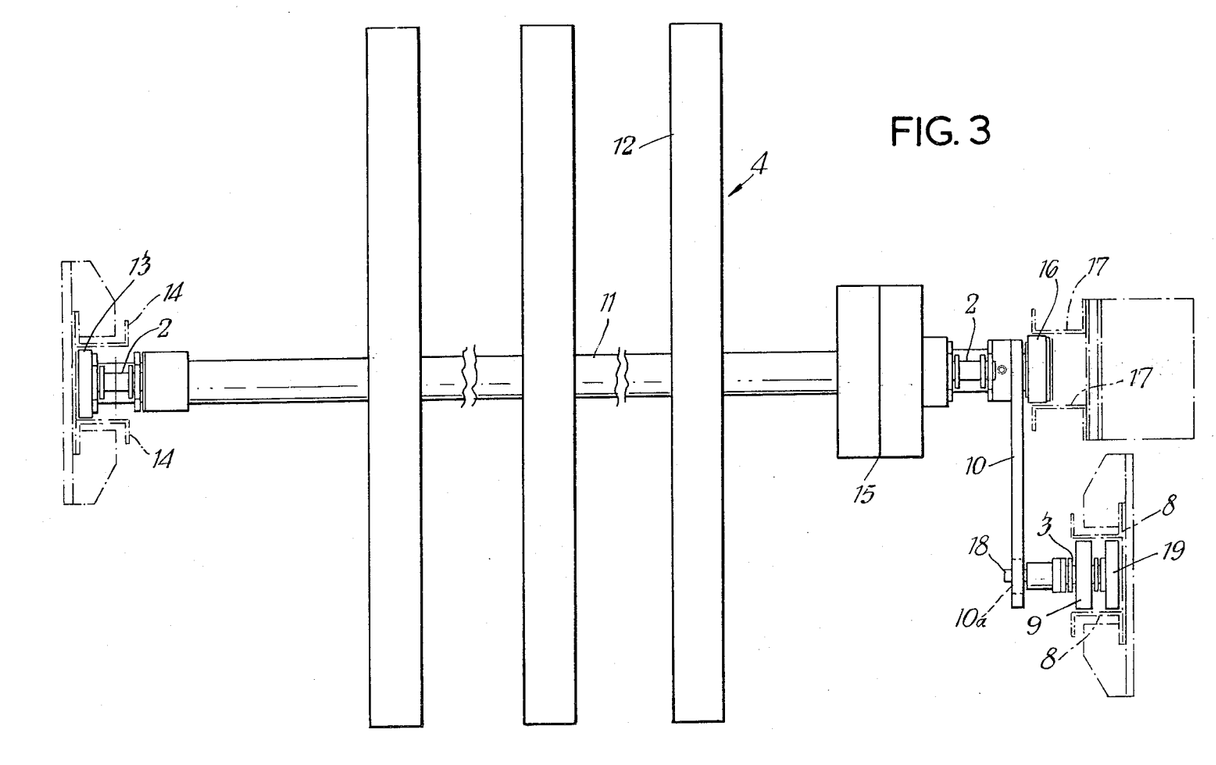
FIG. 3 is a plan view of another form of construction of the tray assembly.

The construction of a tray 4 is shown in more detail in FIG. 3. Each tray consists of a spine 11 to which a number of parallel slats or bars 12 are attached and the spine 11 is supported at each end by a chain 2. One end of the spine 11 is also provided with a guide pad 13 sliding between guide rails 14, the pad being of an anti-friction material and serving to guide this end of the spine both against end thrust and in the direction of travel along the rails 14. Inserted in the spine near the other end thereof (to the right as shown in FIG. 3) is a connector block 15 which enables a tray to be attached to or removed from the conveyor, without dismantling the chains 2.

The end of the spine 2 beyond the connector 15 is guided by a wheel 16 running between rails 17 and between the chain 2 at this end of the spine and the wheel 16 is a crank arm 10 rigidly aligned with the spine 11 so that it extends in the same plane as the slats 12 of the tray 4. The opposite end of the crank 10 has a slot 10a which is engaged by one end of a pin 18 the other end of which is secured to the pilot or control chain 3 and which also carries a guide wheel 9 mounted on the chain 3 and an anti-friction guide pad 19 at its other end. The chain 3 is guided laterally in its travel by the wheel 9 running between the rails 8 and end loads are taken up by the pad 19 as it also slides between the rails 8.

Operation of the tray 4 shown in FIG. 3 corresponds to the embodiments of FIGS. 1, 2 and 6 and it will be seen how the tray attitude is controlled throughout its travel.

Figure 4:
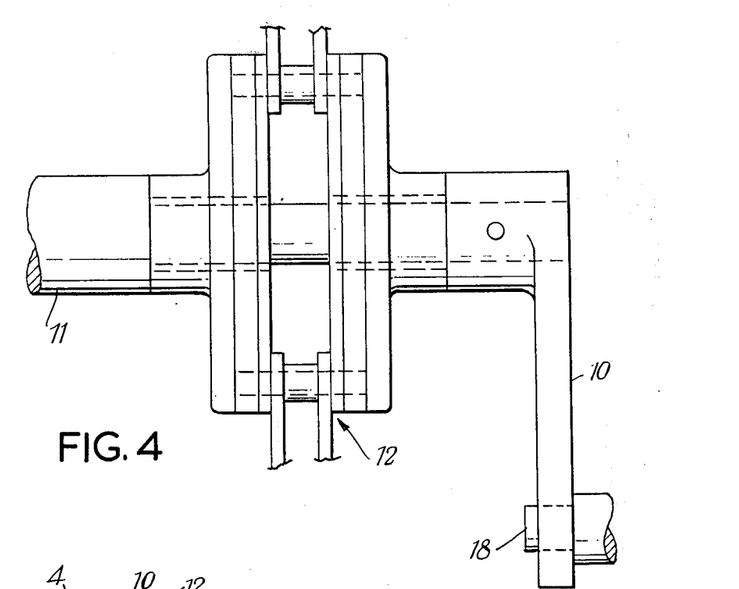
FIG. 4 is a plan view of a further embodiment showing the guidance of the main driving member.

In FIG. 4 the tray 4 (not shown) is carried on the spine 11 which is supported in a cantilever manner from a single main chain 2. The main chain 2 in this embodiment is provided with elongated slide blocks which are positively guided on rails which fit closely into each side of the blocks preventing the links of the chain rotating in the plane of or about the axis of the spine 11 except under control where the single main chain 2 passes round a curve in the route of the conveyor. As before, the spine 11 is connected to a pilot chain (not shown) by means of the crank arm 10 and the pin 18 by which the tray attitude is positively controlled throughout its travel.

Figure 5:
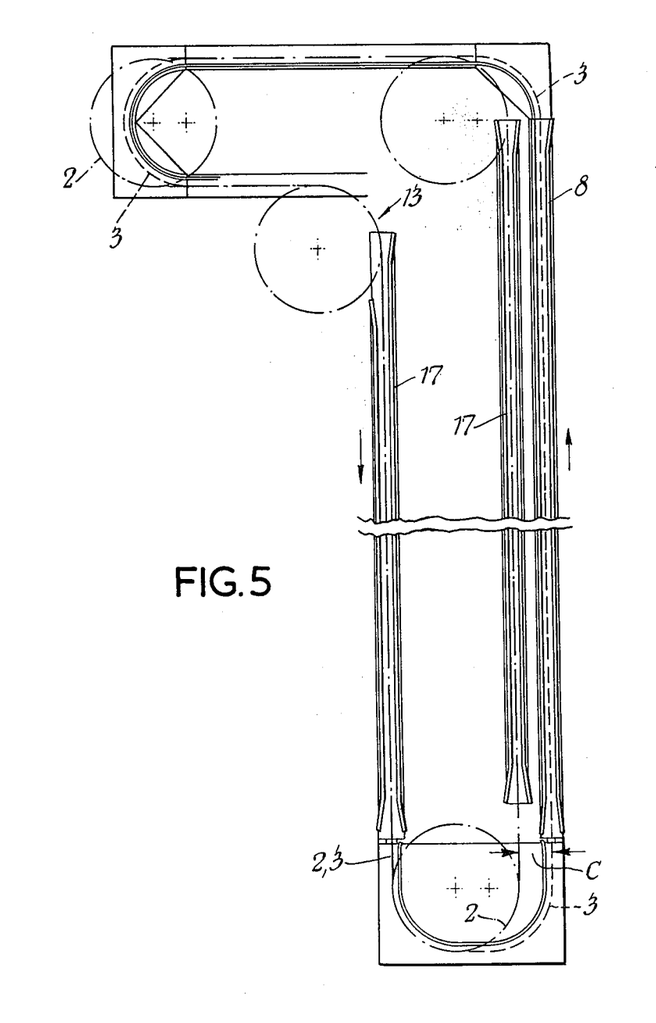
FIG. 5 is a side elevation of the conveyor shown schematically in FIG. 1 and illustrating the guide means for the driving and control members.

FIG. 5 illustrates an arrangement of the guide rails 8 and 17 for the chains 3 and 2 respectively. In the right hand part of the figure, the trays (not shown) are ascending and due to the lateral offset of the chains by the distance 'C' the trays are in their horizontal attitude. Each end of the guides is provided with a tapered end region which serves to guide the wheels or rollers provided in association with the chains and where provided, the anti-friction pads into and out of the guide rails which in this embodiment are U-shaped channels. The inlet end of the guide rails at the beginning of the left-hand, downward track is further cut-away to allow the crank 10 to accommodate the chording effect as it traverses the region 13 where each tray is rotated from the horizontal to the vertical attitude. Each tray passes down to the bottom of the conveyor in this condition and as it passes under the lower wheels to the chassis are once more offset by the distance 'C' and the trays are restored to the horizontal for re-loading. As FIG. 5 shows, the top of the conveyor is extended to the left in a manner similar to that shown in FIG. 1 for cooperation with an unloading station (not shown), the chains being driven from the sprockets mounted on a common axis.

Figure 7:
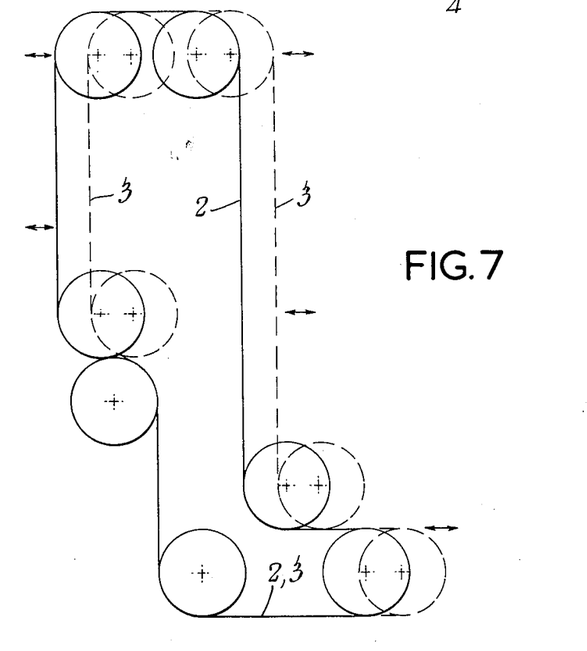
FIG. 7 shows diagrammatically an embodiment of the conveyor in which the relative paths of the driving and control members are modified to vary the number of regions in which the trays are horizontal or vertical.

The schematic diagram of FIG. 7 shows how any section of the conveyor can be modified so that for part of this section the trays can be horizontal and for the remaining part they are vertical. The left-hand part of FIG. 7 is so divided and the trays are therefore only vertical in the lower-left hand part of the figure; through out the rest of their travel they remain horizontal for cooperation with loading and unloading stations disposed at suitable locations. Provided that the relative offsets indicated by the double-headed arrows are all equal, the chains will all have the same total length.

Figure 8:
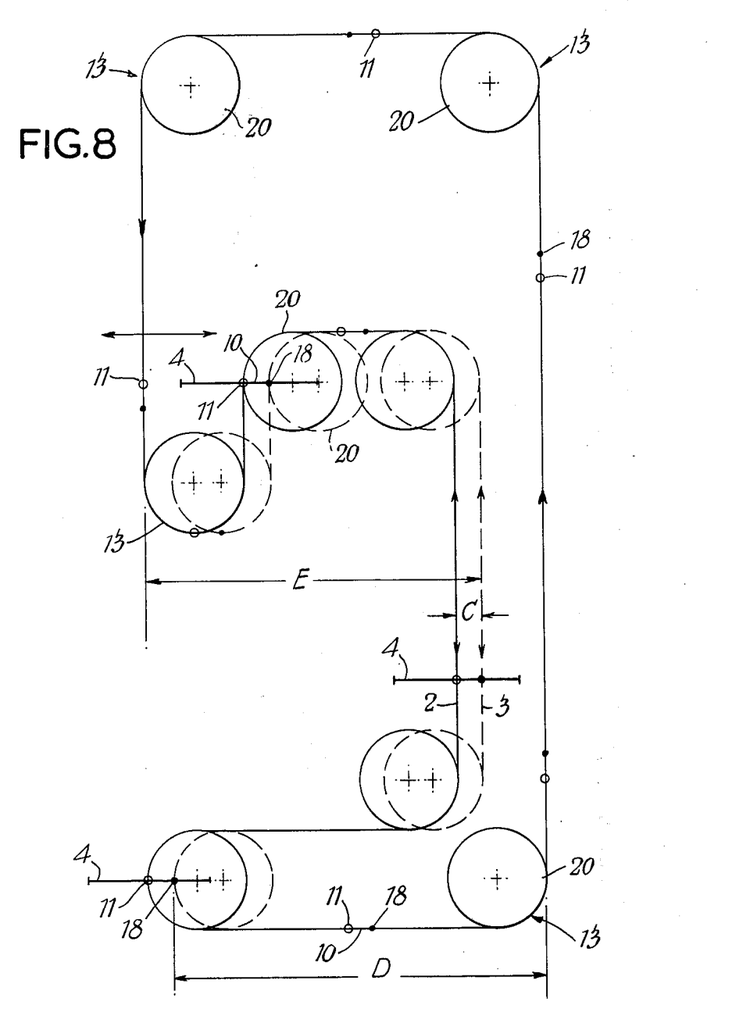
FIGS. 8 to 11 are further schematic illustrations of other possible variations of the conveyor path and showing how the trays are controlled throughout their travel.

In FIG. 8, the path of the conveyor is shown in a more convoluted arrangement which still allows the trays 4 to be controlled in their attitude at all times during their travel. The chains 2 and 3 pass round wheels 20 in the direction indicated by the arrow-heads and are always horizontal except where they travel up the right-hand side and down part of the left-hand side of FIG. 8 after passing through regions 13 where they rotate from the horizontal to the vertical position. The spine 11 and pilot chain connection 18 together with the crank arm 10 are indicated diagrammatically in FIG. 8 and since the cranks 10 are parallel to the trays 4 it will be clear from FIG. 8 how the required control of the trays is achieved. It is important in this embodiment as in the case of the embodiments already described to control the relative lengths and offsets of the chains 2 and 3 and as FIG. 8 shows, with a crank length of 'C' the relative displacement D at the bottom of the conveyor is equal to the pilot chain 3 less the dimension C on the main chain 2 while in the central part of the conveyor the relative displacement E is equal to the pilot chain 3 added to dimension C; these offsets being mutually compensatory.

Figure 9:
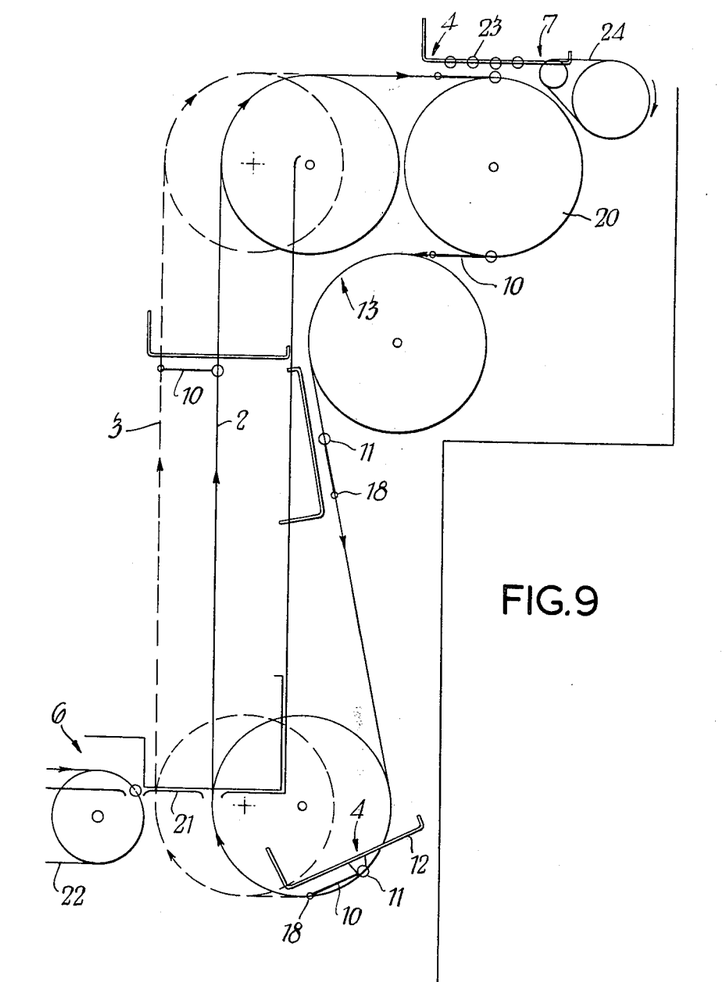

FIG. 9 illustrates an embodiment of the conveyor-elevator and showing how the vertical part of the conveyor can be arranged to occupy a narrower shaft and also illustrating loading and unloading arrangements in which each tray has means to assist the movement of its load on to or off the tray. Each tray 4 has the ends of its slats 12 turned upwardly as shown. At the loading point the slats 12 pass upwardly between bearers 21 onto which a load has been pushed by a push-bar conveyor 22, the load being retained between the upturned ends of the slats 12. The loaded trays pass upwards and are then moved horizontally to the unloading point 7 at which location the slats 12 pass downwardly between rollers 23 which receive the load from the tray. The trailing upturned ends of the slats 12 push the load forwards as they move round the wheel 20, so driving the load on to the take-off drive 24. As the trays are carried round the wheel 20 at the discharge station they are completely unloaded and are progressively rotated about their spines 11 until they are aligned with the chains 2 and 3 as they travel down to the bottom of the conveyor, the chains 2 and 3 being guided in a common plane in this region, returning to the horizontal before they commence to travel upwardly again.

Figure 10:
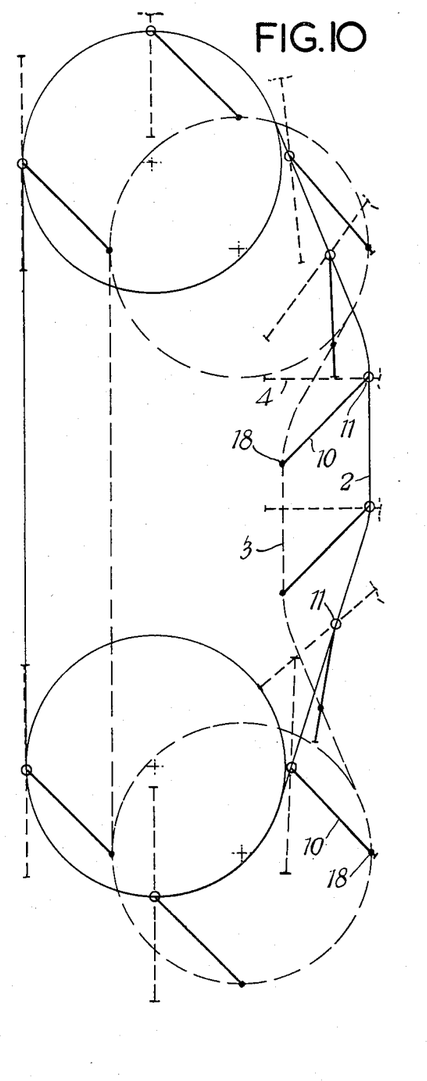
Figure 11:
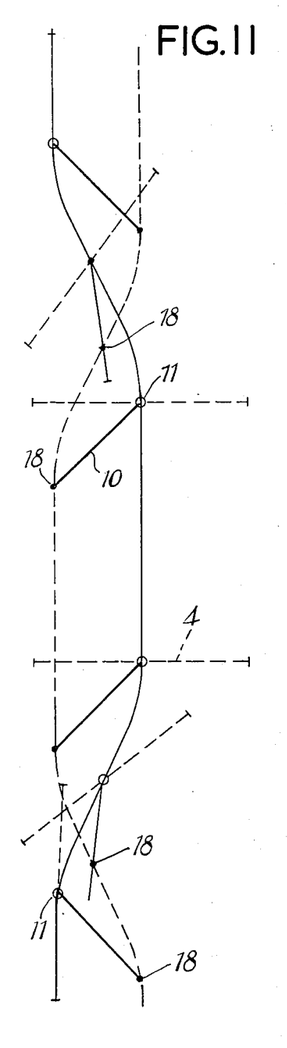

FIGS. 10 and 11 illustrate further embodiments of the conveyor in which each crank arm 10 is connected to the spine 11 of the trays at an acute angle and showing how the chains 2 and 3 require to be guided to ensure positive control of the trays 4 during their travel and in which the means for accommodating the chording effect in those regions where the trays are rotated between the horizontal and vertical attitudes.

Figure 12:
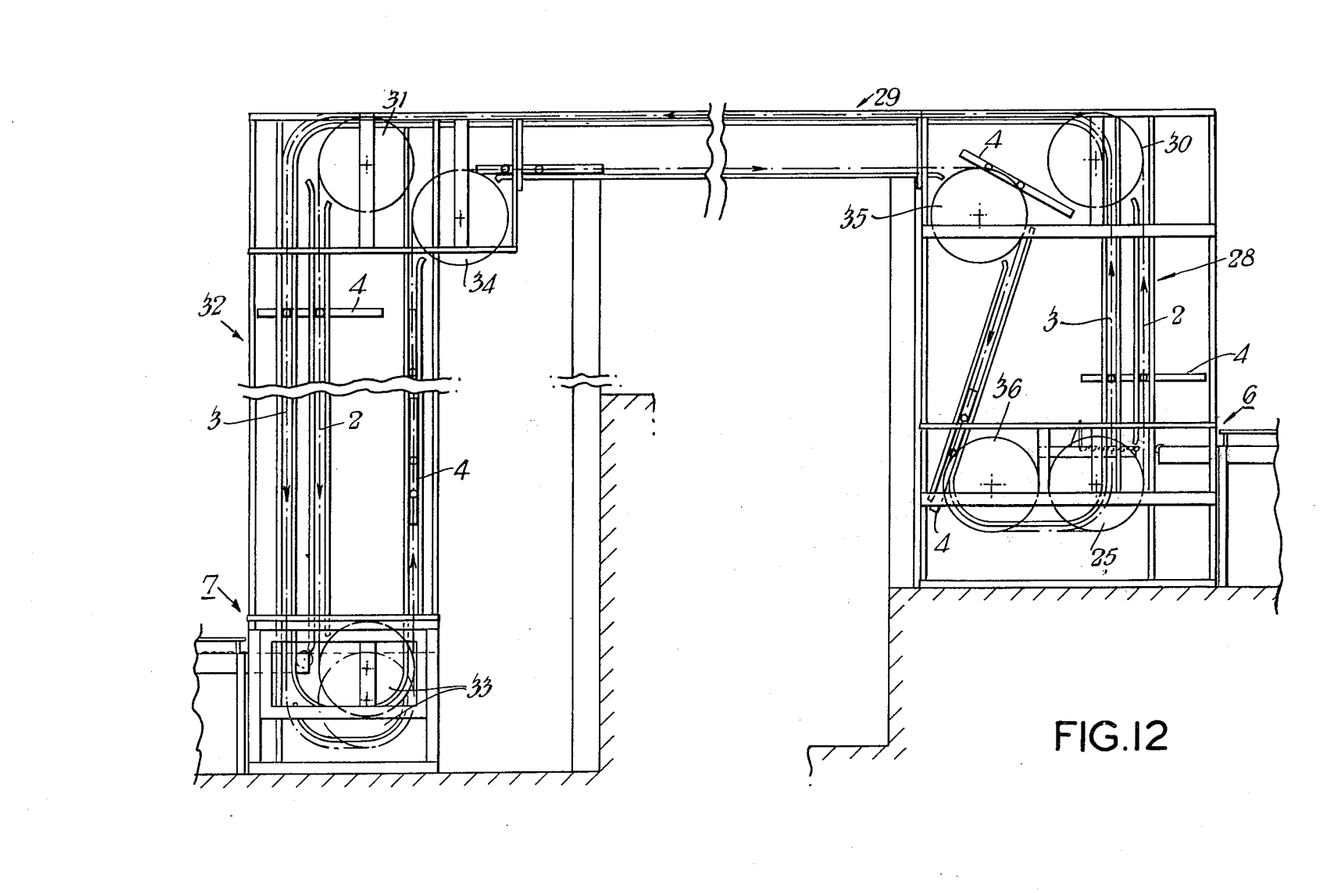
FIGS. 12 and 13 are side and plan views respectively of a typical elevator-conveyor installation.
Figure 13:
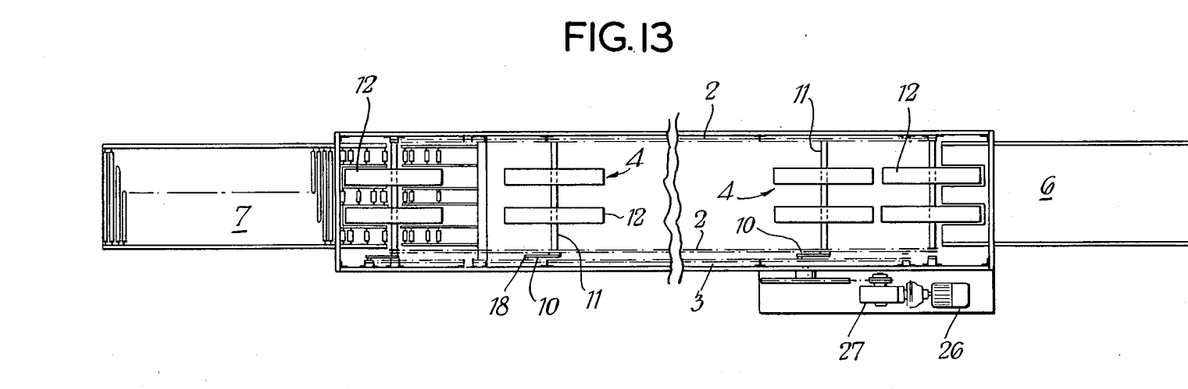

The conveyor-elevator installation shown in FIGS. 12 and 13 is principally intended to handle unitised loads such as pallets, although it will be appreciated that other loads can be handled without substantial modification of the arrangement shown. The installation shown in the Figures consists of a receiving region, a horizontal region and a vertical section at the lower end of which is a discharge station.

The trays 4 are carried on the main chains 2 about sprocket wheels 25 at the loading station 6, the chains being driven by a motor 26 through gears 27. The trays are held in the horizontal position as they travel upwardly from the station 6 by their crank arms guided by the pilot chain 3. At the top of the ascending conveyor flight 28 the chains move round wheels 30 into a common horizontal plane, and the trays 4 move along the top of the horizontal section 29 until the chains pass round sprocket wheels 31 and enter the vertical section 32 down which the trays are conveyed still in the horizontal condition due to the mutual lateral displacement of the chains 2 and 3 in their respective guides.

At the bottom of the section 32 the trays pass through the unloading station 7 where a conveyor extracts the load. As the trays pass round the bottom sprocket wheels 33 they are rotated into the vertical position as the guide tracks come into a common plane. The trays which are now vertically oriented pass upwards through vertical section 32, pass round sprockets 34 and travel back across the horizontal span in the lower flight of the conveyor the trays now being horizontal.

At sprocket 35 the trays once more are guided into an attitude which in this case is at an acute angle to the vertical before passing down to sprocket 36 where they are returned to the horizontal position for re-loading.

The loading and discharge stations 6 and 7 preferably comprise conveyors which interleave with the slats 12 of the trays 4 in order to supply and receive the conveyor loads. These conveyors may be powered belts or rollers, idle rollers or combinations of these means and they may be driven independently or in synchronism with the drive for the chains 2 and 3. Where desired, the slats of the trays may have rollers or the like to assist in transferring the loads.

By employing trays 4 having a grid-like form, loading and unloading may be accomplished by using fixed grids or fingers passing between the slats 12 of the trays as has been described. Suitable timing means can be provided to feed loads to the grids in synchronism with the travel of the conveyor. In a further development of the invention, the loading and/or the discharge grid may include power operated means such as pushers or rollers to transfer the load to or from the trays as they pass. Powered belts may also be used to move loads into and out of the conveyor. Delivery may also be effected on a vertical run by sliding using appropriate inclination of the tray.

The conveyor may be run in either direction and may if desired be reversible. Extra grids may be provided which can be controllably moved into the path of the conveyor to optionally provide extra load or discharge points.

If, as shown diagrammatically in the drawings, one end of the conveyor is extended, it can facilitate loading and/or unloading, loading or unloading being in line with the conveyor and on to or off the trays in their horizontal attitude. In a typical example of such an arrangement at a loading station each tray has a pusher attached to one end of the tray slats 12, the load being for example fed on a series of cantilever rollers which are displaced vertically upwards with respect to the surface of the tray at this point. Movement of the tray 4 by movement of the main and pilot chains 2 and 3 causes the pusher to engage the load and carry it along beyond the end of the cantilever rollers where it can drop onto the tray. At a discharge station, as the trays slats 12 pass downwardly between the cantilever rollers, the pusher can drive the load from the tray on to the rollers for removal from the conveyor.

Where desired, each tray may be of a so-called "roller top" type or have its own drive means for loading or unloading, the drive means being actuated at a selected loading or discharge station.

The main and pilot chains may be offset vertically instead of laterally, in which case the cranks or arms are at 90° to the tray surface. The main and pilot chains are of the same effective lengths and provided that the offset is constant, the trays angle or attitude remains the same. It will be clear that offset less than the crank length will give intermediate angles of tray inclination. Chain tensioning units are preferably provided to ensure that the main and pilot chains are always of identical operative length.

I claim:

1. An endless conveyor system comprising:
    a first endless driving chain;
    means for guiding the driving chain along a preselected path;
    means pivotally coupled to the driving chain for supporting a load to be conveyed;
    an endless control chain;
    a control arm rigidly connected to the load supporting means and pivotally connected to the control chain;
    means for guiding the control chain along a path displaced from the preselected path, whereby the attitude of the load supporting means is under positive control throughout its travel along the preselected path, the attitude of the load supporting means being variable in dependence upon the relative displacement between the driving chain guide means and the control chain drive means; and
    means attached to the control arm for automatically varying its effective length between the control chain and the load supporting means where the load supporting means is being pivoted between horizontal and vertical limit positions along an arcuate part of the preselected conveyor path.

2. A conveyor according to claim 1 wherein the load supporting means is pivotally mounted between the first endless driving chain and a second endless driving chain guided over a corresponding preselected path to the first endless driving chain.

3. A conveyor according to claim 1 wherein the load supporting means comprises a tray carried on a spine member, said spine member being connected at one end pivotally to the first endless driving chain, the tray being controllably pivotable about the longitudinal axis of the spine.

4. A conveyor according to claim 1 wherein the load supporting means comprises a tray carried on a spine member which is pivotally connected at each end to one of the first or second endless driving chains and said tray is controllably pivotable about the longitudinal axis of the spine.

5. A conveyor according to claim 1 wherein non-rotatable anti-friction bodies are associated with the first endless driving chain and the endless control chain, said non-rotatable anti-friction bodies being positively guided along the preselected conveyor path by guide rails and being connected to the endless driving and control chains.

6. A conveyor according to claim 1 wherein the load supporting means comprises a tray mounted on a cantilever spine extending from the first endless driving chain, the tray being rotatable about the axis of the spine and wherein the load bearing means is pivotally mounted on a link of the first endless chain and is adapted to be positively guided along the path of the conveyor by guide means engaging the first endless chain on opposite sides thereof and the control arm is connected at one end to the spine and at the other end to the endless control chain.

7. A conveyor according to claim 1 wherein the load supporting means include means projecting above the path of the load supporting means for operatively engaging a load during the transfer of said load between the load-supporting means and a loading or unloading station, the projecting means imparting movement to the load in the direction of transfer on to or off the conveyor.

8. A conveyor according to claim 1 wherein the driving chain guide means and the control chain guide means are relatively displaced by a distance corresponding to an inclined position of the load supporting member.

* * * * *